United States Patent
Kuwabara et al.

(10) Patent No.: US 8,562,021 B1
(45) Date of Patent: Oct. 22, 2013

(54) FRONT VEHICLE BODY STRUCTURE

(71) Applicant: Fuji Jukogyo Kabushiki Kaisha, Tokyo (JP)

(72) Inventors: Mitsumasa Kuwabara, Tokyo (JP); Hiroyuki Matsuda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/793,694

(22) Filed: Mar. 11, 2013

(51) Int. Cl.
*B62D 7/22* (2006.01)

(52) U.S. Cl.
USPC ............... 280/784; 280/124.109; 180/311; 180/312

(58) Field of Classification Search
USPC ............ 280/784, 124.109; 180/299, 311, 312
See application file for complete search history.

(56) References Cited

U.S. PATENT DOCUMENTS

| | | | |
|---|---|---|---|
| 5,042,837 A * | 8/1991 | Kleinschmit et al. ......... | 280/784 |
| 7,380,829 B2 * | 6/2008 | Kishima ....................... | 280/781 |
| 7,393,016 B2 * | 7/2008 | Mitsui et al. .................. | 280/784 |
| 7,900,964 B2 * | 3/2011 | Chretien et al. .............. | 280/784 |
| 8,196,696 B2 * | 6/2012 | Karube et al. ................ | 180/311 |
| 2007/0169982 A1 * | 7/2007 | Ogawa et al. ................ | 180/312 |
| 2011/0083923 A1 * | 4/2011 | Ajisaka ........................ | 180/291 |

FOREIGN PATENT DOCUMENTS

| | | |
|---|---|---|
| JP | 63-145764 U | 9/1988 |
| JP | 05-085414 A | 4/1993 |

* cited by examiner

*Primary Examiner* — Toan To
(74) *Attorney, Agent, or Firm* — Smith, Gambrell and Russell, LLP

(57) ABSTRACT

There is provided a front vehicle body structure including: a front sub frame mounted below front side frames; a tie rod disposed forwardly of an axle; a tie rod pressing member having a pressing portion which is mounted on the front sub frame forward of the tie rod and presses the tie rod when a collision occurs; and a rotational movement generating member for causing the tie rod pressing member to generate a rotational movement by deforming an area on which the tie rod pressing member is mounted in the front sub frame, by the load received when a collision occurs. The pressing portion is displaced by the rotational movement from a first position which is out of a steering range of the front wheels to a second position at which the pressing portion swings outward in the vehicle width direction and which allows pressing of the tie rod.

16 Claims, 6 Drawing Sheets

FORWARD DIRECTION OF VEHICLE

FRONT VEHICLE BODY STRUCTURE

CROSS-REFERENCE TO RELATED APPLICATIONS

The present application claims priority from Japanese Patent Application No. 2012-071311 filed on Mar. 27, 2012, the entire contents of which are hereby incorporated by reference.

BACKGROUND OF THE INVENTION

1. Field of the Invention

The present invention relates to a front body structure of a vehicle such as an automobile, and particularly, to a vehicle having a simple and compact structure which allows steering of the front wheels in a toe-in direction at the time of a small overlap offset collision.

2. Description of the Related Art

Safety against an offset collision has been demanded of the body structure of a vehicle such as an automobile, the offset collision being such that a side part of the vehicle collides with an object. In recent years, particularly, an improved performance for a so-called small overlap collision in the offset collision has been demanded of the body structure of a vehicle, the small overlap collision being such that only a side portion of the vehicle in the vehicle width direction collides with an object.

In a full-lap collision in which the entire front end of the vehicle collides, or an offset collision with a relatively large overlap, absorption of energy and load transfer in the rear direction of the vehicle can be performed using the front of a front side frame which is disposed extending in the fore-and-aft direction of the vehicle along the side of the engine compartment. However, in the case of a small overlap offset collision (which is a collision such that only the outside portion of the front side frame collides with an object), a structure is needed that can absorb and transfer energy without depending on the front end portion of the front side frame.

For example, Japanese Unexamined Utility Model (Registration) Application Publication No. S63-145764 describes a technology for improving the strength of the area outside the side frame of the vehicle body, the technology providing an obliquely disposed reinforcement member which connects between the rear surface of the cross member provided at the back of the front wheels and the side floor frame at the back of the rear surface. However, when the cabin itself is reinforced with the reinforcement member to obtain sufficient collision safety performance in this manner, it is necessary to absorb and transfer energy without depending on the front side frame, and thus a significant increase in vehicle weight and cost occurs, thereby impairing the driving performance as well as the fuel consumption performance of the vehicle.

Japanese Unexamined Patent Application Publication (JP-A) H5-85414 describes a technique in which a tie rod bending member is disposed in front of the tie rod disposed forward of the front wheel axle, and at the time of a collision, the tie-rod bending member is pushed backward so as to bend the tie-rod and turn the front wheels in a toe-in direction, thereby preventing the front wheels from hitting the side sill even when the front wheels are pushed back.

A collision of the front wheels with the respective side sills may be prevented by steering the front wheels in a toe-in direction at the time of a collision like the technology disclosed in JP-A No. H5-85414 described above. In this manner, an improved performance for a small overlap offset collision can be achieved with a relatively small increase in weight. However, such a tie rod bending member needs to be disposed at a location away from the steering range of the front wheels when the vehicle is in normal operation (when no collision occurs). When the tie rod is to be pushed only by the backward movement like JP-A No. H5-85414, the tie rod bending member needs to be moved with a considerably large stroke in order to practically bend the tie rod, and thus it is difficult to obtain such a movement with sufficient reproducibility. In addition, with the above configuration, the length of the tie rod bending member in the fore-and-aft direction of the vehicle is long, and thus it is impracticable to mount the tie rod bending member in the front overhang of a real vehicle. In view of the above-described problem, it is an object of the present invention to provide a vehicle having a simple and compact structure which allows steering of the front wheels in a toe-in direction at the time of a small overlap offset collision.

SUMMARY OF THE INVENTION

The present invention has been designed in consideration of the circumstances described above. A first aspect of the present invention is a front vehicle body structure including: a pair of front side frames on right and left which project in a forward direction of a vehicle from a front of a cabin; a front sub frame which is mounted on a lower portion of the front side frames; a tie rod which is disposed forwardly of an axle of a front wheel and configured to steer the front wheel; a tie rod pressing member having a pressing portion which is mounted on the front sub frame in front of the tie rod in the forward direction of the vehicle and is configured to press the tie rod from a front side at a time of a collision; and a rotational movement generating member which is disposed projecting from the front sub frame in the forward direction of the vehicle, and configured to cause the tie rod pressing member to generate a rotational movement by bending and deforming an area in a direction in which a rear side of the area opens outward in a vehicle width direction with respect to a front side of the area, using a load received from a forward position of the vehicle at a time of a collision, the area being a site on which the tie rod pressing member is mounted in the front sub frame. The pressing portion of the tie rod pressing member is displaced by the rotational movement from a first position which is out of a steering range of the front wheel to a second position at which the pressing portion swings outward in the vehicle width direction and which allows pressing of the tie rod. With the above structure, when a small overlap offset collision occurs, the front sub frame is bent and deformed by the rotational movement generating member, the tie rod pressing member is rotated in a direction in which the pressing portion is opened outward in the vehicle width direction, and thus the tie rod is bent and deformed so as to steer the front wheels in a toe-in direction, while steering of the front wheels is not interfered with when the vehicle is in normal operation (when no collision occurs), and therefore the rear of the front wheels can be prevented from colliding with the side sill, thereby improving collision safety performance. Thus, it is possible to provide a vehicle having a simple and compact structure which allows steering of the front wheels in a toe-in direction at the time of a small overlap offset collision.

Preferably, a joint part between the front sub frame and the front side frame is disposed outward in the vehicle width direction with respect to a normal line direction of a load receiving surface provided at a front end of the rotational movement generating member. With the above structure, there is generated a moment which causes the portion to which the tie rod pressing member of the front sub frame is attached to rotate around a joint part between the front side frame and the front sub frame, and thus the above-described effect can be obtained without fail.

Preferably, the front sub frame has a bending portion in a range which is located rear of a mounting part of the tie rod pressing member relative to a forward direction of the vehicle, and is located in front of the pressing portion relative to a forward direction of the vehicle, an outside of the bending portion projecting in the vehicle width direction. With the above structure, reproducibility of the bending deformation mode at the time of a collision can be improved by providing the front sub frame with a bending portion.

Preferably, the tie rod pressing member is disposed projecting from the front sub frame outward in the vehicle width direction, and includes a load receiver configured to receive an input of a load from a forward side of the vehicle after the pressing portion is displaced to the second position. With the above structure, by pushing the tie rod pressing member to rearward of the vehicle after the tie rod pressing member is rotated to the second position, the tie rod can be bent without fail.

Preferably, the pressing portion of the tie rod pressing member, when being disposed at the first position, overlaps with the front sub frame in a plan view of the vehicle. With the above structure, when the vehicle is in normal operation, the tie rod pressing member does not interfere with the steering of the front wheels, thereby causing no disadvantage such as an increase in the minimum turning radius of the vehicle.

DESCRIPTION OF THE PREFERRED EMBODIMENTS

The present invention achieves the above-described object by bending the tie rod with the tie-rod pressing member in such a manner that the front sub frame is deformed by a load transmitted from the crash box, so that the tie rod pressing member, which is normally disposed above the front sub frame (cradle), swings outward just before the tie rod.

Embodiment

Figure 1:
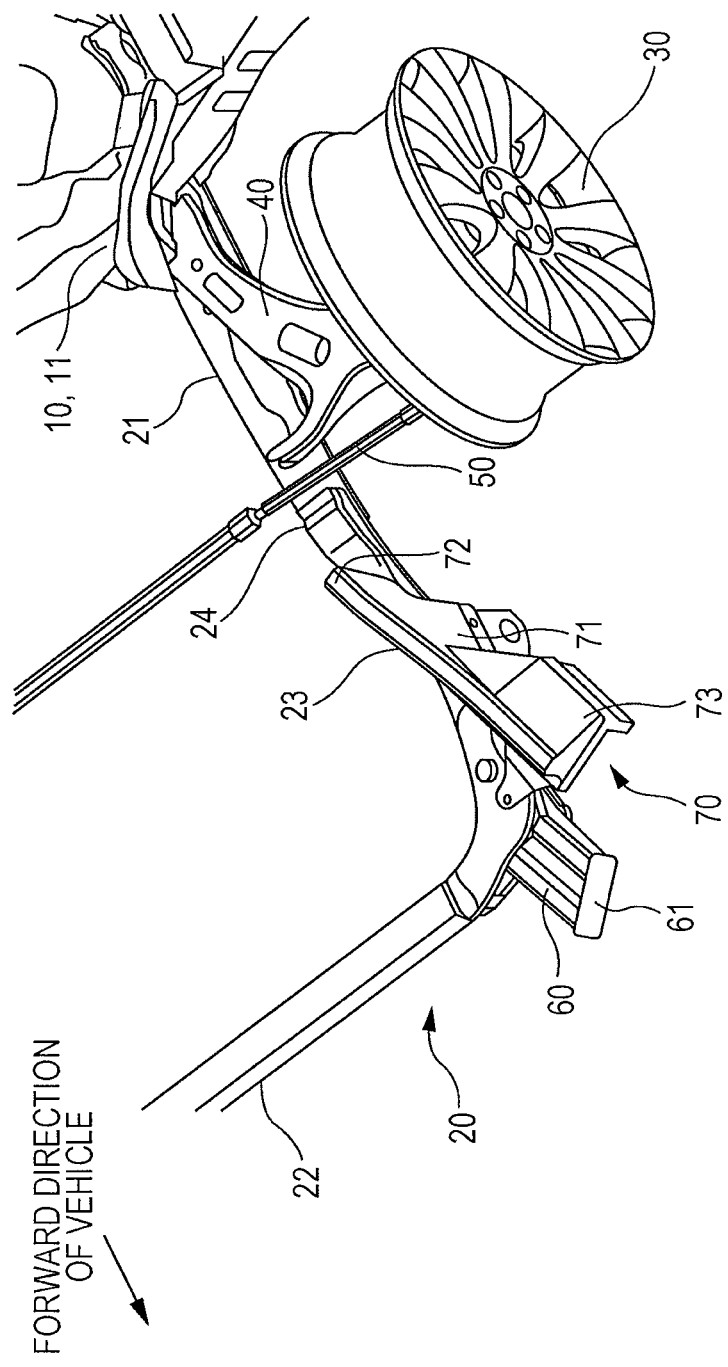
FIG. 1 is a perspective view of an embodiment of a front vehicle body structure according to the present invention.

Hereinafter, an embodiment of a front vehicle body structure according to the present invention will be described. The front vehicle body structure in the embodiment is applied, for example, to a vehicle such as an automobile having an engine compartment at the front of the vehicle. FIG. 1 is a perspective view of the front vehicle body structure in the embodiment. In FIGS. 1 to 6, for the purpose of simplifying the illustration and understanding, illustration of various well known components such as an exterior member, a front side frame, an engine, an apron, and a front suspension strut of a vehicle are omitted, and only the members relevant to the front wheel steering at the time of a small overlap offset collision are mainly illustrated.

The vehicle includes a cabin 10, a front sub frame 20, a front wheel 30, a lower arm 40, a tie rod 50, a crash box 60, and a tie rod pressing member 70.

The cabin 10 is a place where a driver rides in, and at the front of the cabin 10, a toe board 11 which serves as a partition wall between the cabin 10 and an engine compartment is disposed near the feet of a driver on the front seat. A pair of front side frames (mainframe, not illustrated) are formed projecting from the toe board 11 in the forward direction of the vehicle, and are disposed with the engine compartment being interposed between the front side frames in the width direction of the vehicle.

Figure 2:
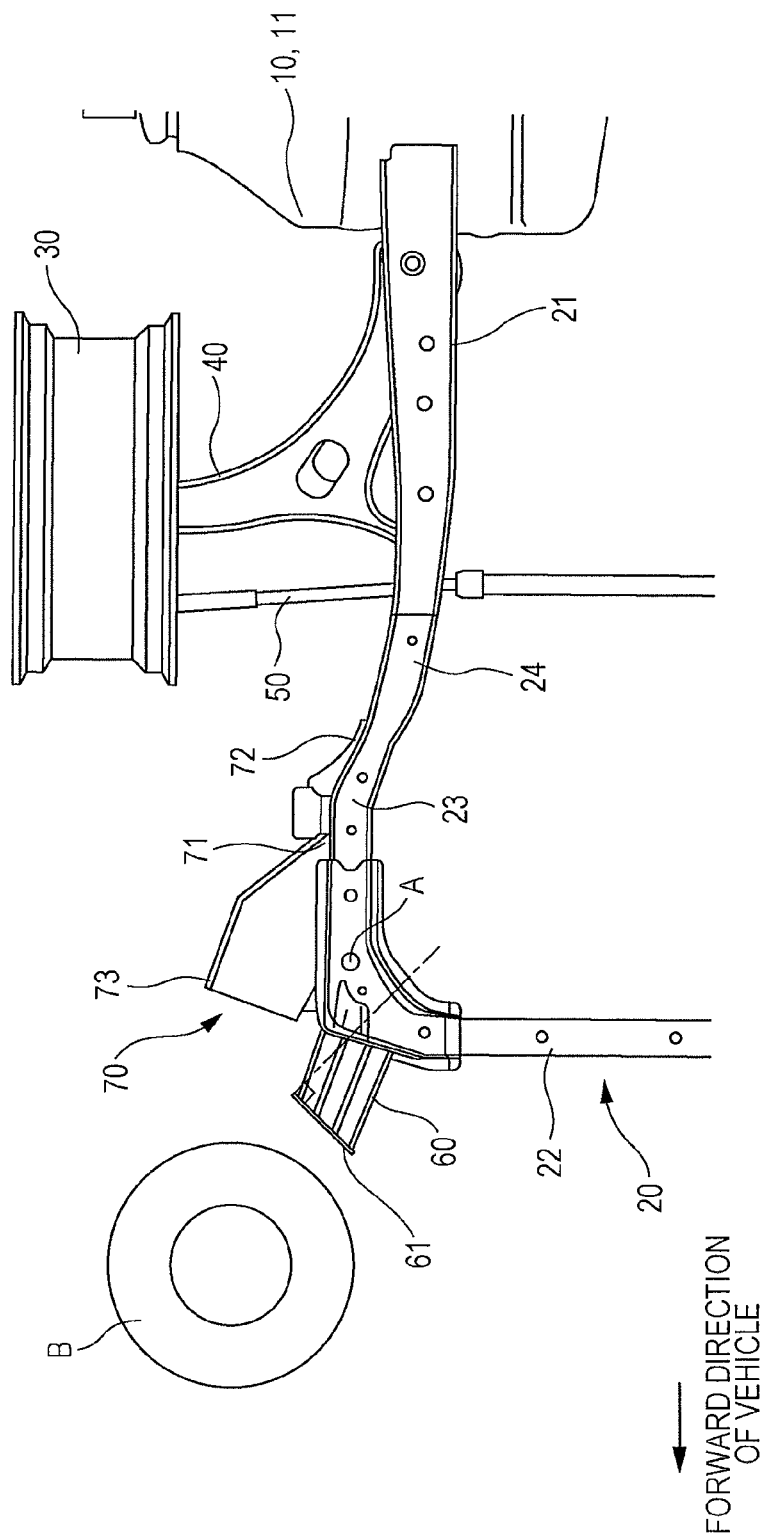
FIG. 2 is a bottom view of the front vehicle body structure in the embodiment before a small overlap offset collision.

A front sub frame 20 is a body structure member which is mounted below the front side frames. The front sub frame 20 includes side portions 21 extending in the fore-and-aft direction of the vehicle, and a front portion 22 which connects between the front ends of the side portions 21 on the left and right. The front sub frame 20 is formed in a substantially rectangular frame shape. The front end of each side portion 21 is secured to a bracket which projects downward from the front end of the front side frame, with a vertically-disposed bolt or the like. The joint part A is illustrated in FIG. 2. The rear end of each side portion 21 is secured to a lower portion of the toe board 11 in the cabin 10 with a bolt or the like. The side portion 21 and the front portion 22 are formed in a beam shape having a substantially rectangular cross section.

FIG. 2 is a bottom view of the front vehicle body structure in the embodiment before a small overlap offset collision. As illustrated in FIG. 2, in the side portion 21 of the front sub frame 20, a bending portion 23 and a curved portion 24 are formed from the front to the rear of the vehicle.

The bending portion 23 is disposed at the front of the tie rod 50, and is formed by bending the side portion 21, so that the outside of the bending portion 23 projects in the width direction of the vehicle. The part of the side portion 21 that is located forward of the bending portion 23 is disposed substantially in the fore-and-aft direction of the vehicle, and the part of the side portion 21 that is located immediately rearward of the bending portion 23 is inclined with respect to the fore-and-aft direction of the vehicle, so that the part becomes narrow at the rear.

The curved portion 24 is disposed from immediately back of the bending portion 23 to the neighborhood of the tie rod 50 in the fore-and-aft direction of the vehicle, so that the inside of the bending portion 23 projects in width direction of the vehicle. The part of the side portion 21 that is located rear of the curved portion 24 is disposed substantially in the fore-and-aft direction of the vehicle.

The front wheel 30 is rotatable around the vehicle axle via a hub bearing (not illustrated), and is steerably supported around a kingpin (steering pivot, not illustrated). The front wheel 30 is formed by mounting a tire on a rim made of aluminum-based alloy, for example. The front wheel 30 is illustrated as a rim in FIGS. 1 to 5.

The lower arm 40 is a member rockably connected to a hub bearing housing (not illustrated) which houses the hub pairing, and to an area in the side portion 21 of the front sub frame 20, the area being rearward of the curved portion 24. The upper portion of the hub bearing housing is secured to the lower portion of the front suspension strut (not illustrated).

The tie rod 50 is a shaft-shaped member disposed substantially in the fore-and-aft direction of the vehicle so as to connect between a steering wheel gearbox (not illustrated)

and a tie rod connecting portion (steering knuckle arm) which is formed at the front of the hub bearing housing with respect to the vehicle axle. The steering wheel gearbox converts rotational motion received from a steering wheel (not illustrated) via a steering shaft into translational motion in the width direction of the vehicle, and drives the tie rods 50 on the left and right substantially in the width direction of the vehicle so as to steer the front wheels 30.

The crash box 60 is a member which is formed projecting from the outer end (corner) of the front portion 22 of the front sub frame 20 in the vehicle width direction, and which receives an input force from an object at the time of a small overlap offset collision and transmits the input force to the front sub frame 20. The crash box 60 is formed in a beam shape having a closed cross section, and is disposed to be inclined with respect to the width direction of the vehicle, so that the front side of the crash box 60 faces the outside in the vehicle width direction. The end of crash box 60 has an end surface portion 61 which receives an input force from an object.

The end surface portion 61 is formed in a substantially planar shape, and the outer end of the end surface portion 61 in the vehicle width direction is disposed at a rearward position in a certain direction to the inner end thereof in the vehicle width direction, so that the certain direction is inclined with respect to the vehicle width direction. Then, as illustrated in FIG. 2, a line normal to the end surface portion 61 and through the outer end thereof in the vehicle width direction is supposed to pass inwardly of the joint part A between the front sub frame 20 and the front side frame. With the above configuration, in the case where the end surface portion 61 receives an input force from an object, the input force applied in the normal line direction generates a moment which causes the front end area of the side portion 21 of the front sub frame 20 to rotate around the joint part A in a direction in which the bending portion 23 is opened outward in the vehicle width direction. The crash box 60 serves as a rotational movement generating member referred in the present invention.

The tie rod pressing member 70 is a member which is formed, for example of a sheet metal and is attached to the upper portion of the side portion 21 of the front sub frame 20. The tie rod pressing member 70 includes a fixed portion 71, a tie rod pressing portion 72, and a load receiver 73.

The fixed portion 71 is a portion which is fixed at a plurality of joint parts to the part in the side portion 21 of the front sub frame 20, that is forward of the bending portion 23. The tie rod pressing portion 72 is formed projecting in the rear direction of the vehicle from the fixed portion 71, and presses the tie rod 50 to bend at the time of a collision.

As illustrated in FIG. 2, before a collision, the tie rod pressing portion 72 substantially overlaps with the side portion 21 of the front sub frame 20 in a plan view of the vehicle and is placed out of the steering range (passing range of the outer surface of the front wheel 30 when the front wheel 30 is steered) of the front wheel 30, and thus the tie rod pressing portion 72 does not interfere with the steering of the front wheel 30.

The load receiver 73 is a portion which is formed projecting outward from the fixed portion 71 in the vehicle width direction, and receives an input force from an object at the time of a small overlap offset collision so as to press the tie rod pressing portion 72 in the fore-and-aft direction of the vehicle. The load receiver 73 is formed projecting from the side portion 21 of the front sub frame 20 in the vehicle width direction, and the front end of the load receiver 73 is disposed rearward of the front portion 22. The load receiver 73 is disposed inclined to the vehicle width direction in such a manner that the outer end of the load receiver 73 in the vehicle width direction is placed at a rearward position of the inner end thereof in the vehicle width direction.

Figure 3:
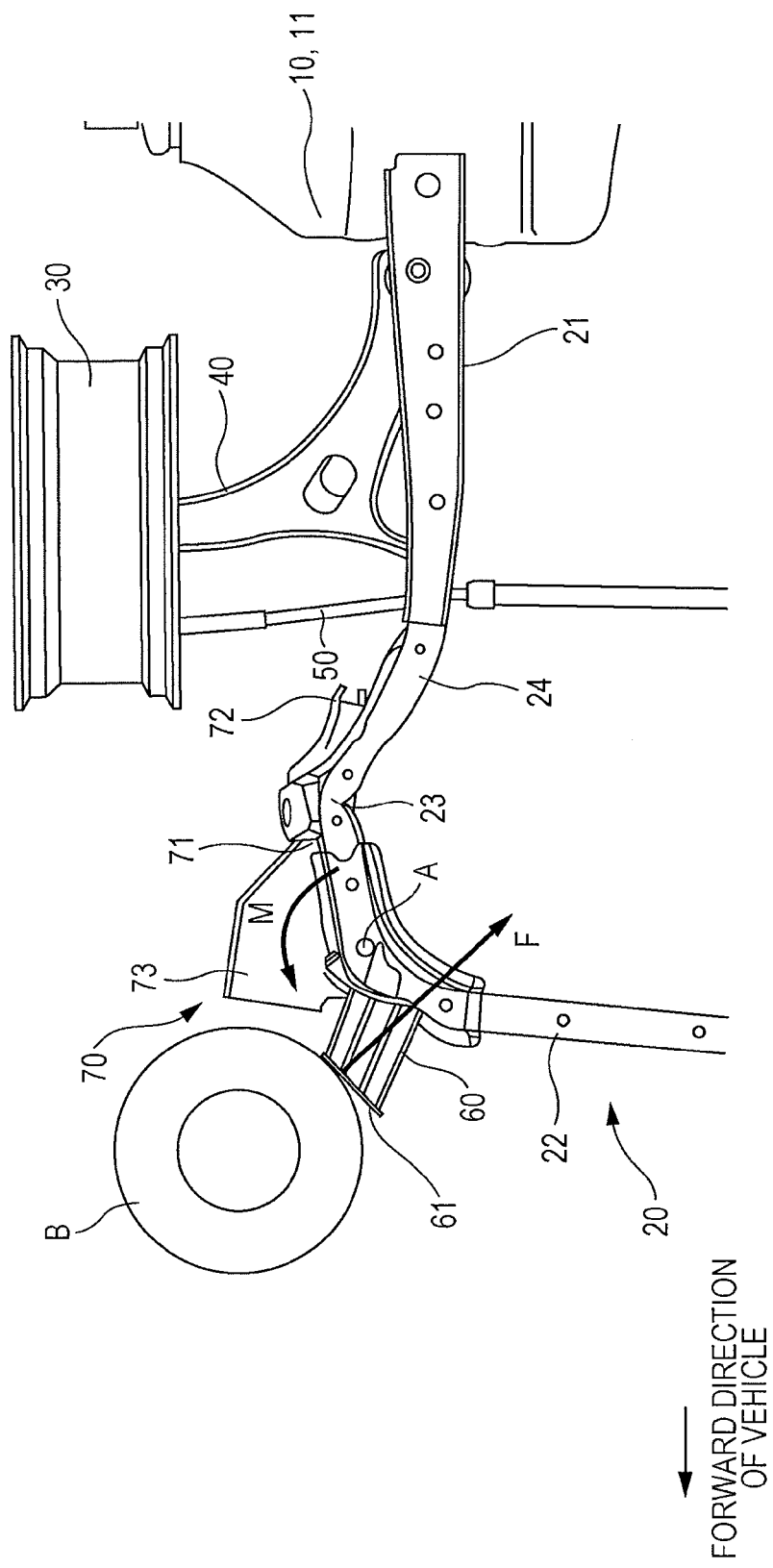
FIG. 3 is a bottom view of the front vehicle body structure in the embodiment immediately after the small overlap offset collision.
Figure 4:
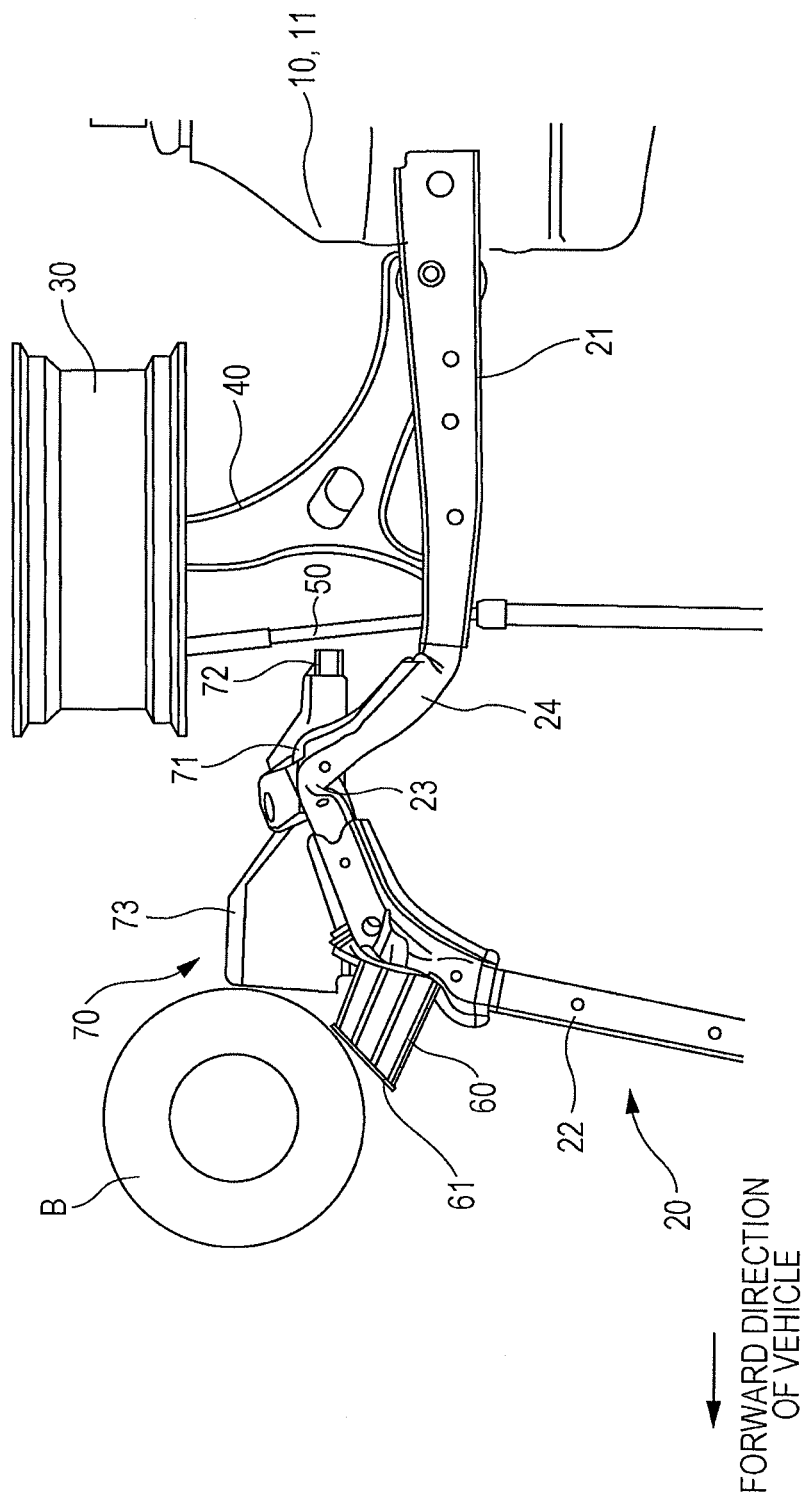
FIG. 4 is a bottom view of the front vehicle body structure in the embodiment immediately after FIG. 3.
Figure 5:
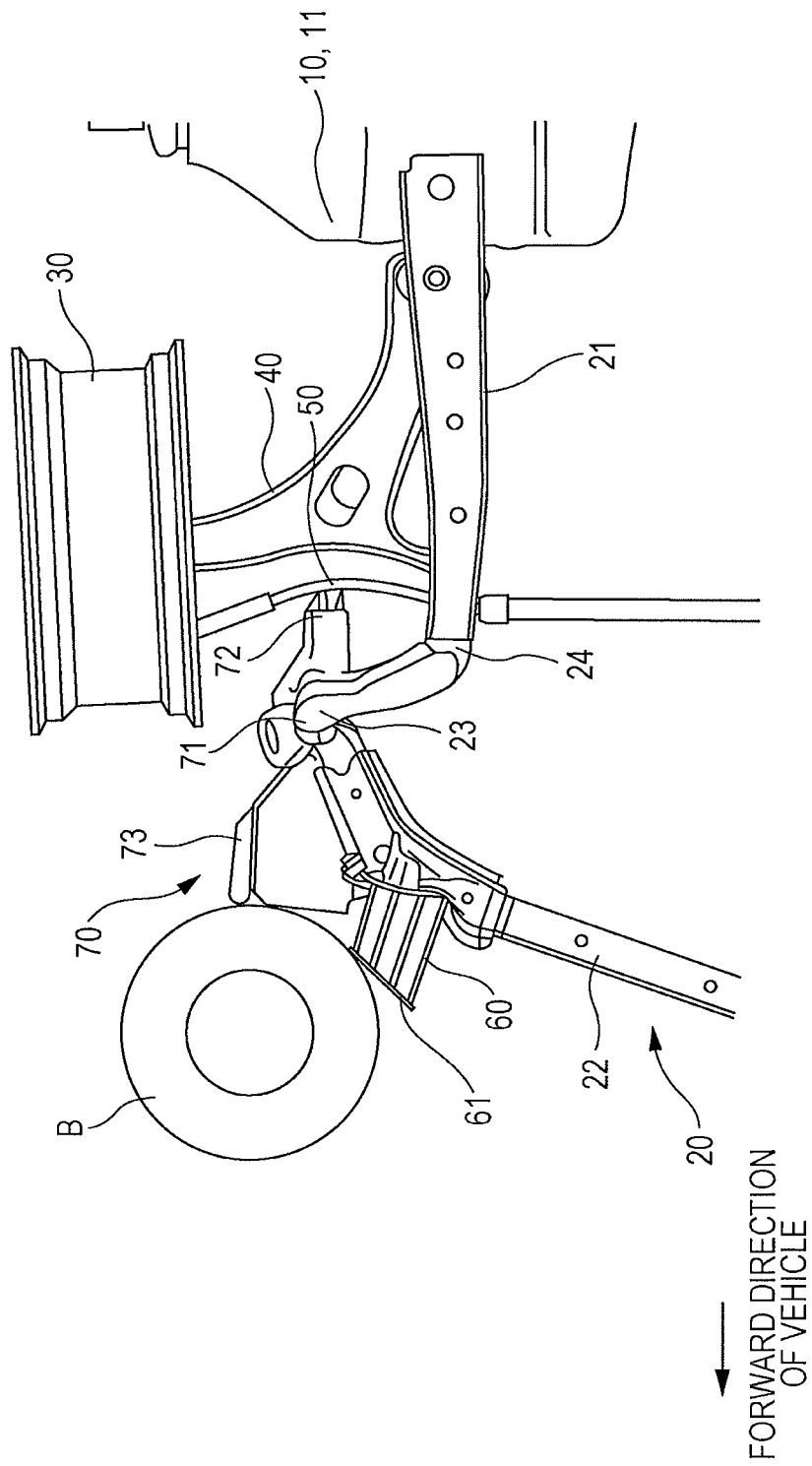
FIG. 5 is a bottom view of the front vehicle body structure in the embodiment immediately after FIG. 4.

Hereinafter, vehicle body deformation process at the time of a small overlap offset collision in the above embodiment will be described. FIGS. 3 to 5 are each a bottom view of the front vehicle body structure in the embodiment, and illustrates the vehicle body deformation process at the time of a small overlap offset collision in time series. The small overlap offset collision is such that a vehicle frontally collides with a vertically-extending pole-shaped object B at the center axis, outwardly of the front end of the front side frame in the vehicle width direction, the object B representing, for example, a utility pole and a signal post.

As illustrated in FIG. 3, when the object B collides with a front end surface 61 of the crash box 60, a load F is applied in the normal line direction with respect to the front end surface 61. The load F generates a moment M which causes the rear side of the front end area of the side portion 21 of the front sub frame 20 to open outward in the vehicle width direction. Consequently, the side portion 21 starts bending deformation using the bending portion 23 as a fulcrum for bending, and thus the front of the side portion 21 and the tie rod pressing member 70 fixed thereto start rotational movement at both rear sides to open outward in the vehicle width direction.

As illustrated in FIG. 4, when the object B further moves backward relative to the vehicle (i.e., the vehicle moves forward relative to the object B), the above-described rotation of the tie rod pressing member 70 and the front of the side portion 21 further increases. Consequently, the tie rod pressing portion 72 of the tie rod pressing member 70 swings outward from the front sub frame 20 in the vehicle width direction, and is displaced just before the midpoint of the tie rod 50.

As illustrated in FIG. 5, when the object B further moves backward relative to the vehicle (i.e., the vehicle moves forward relative to the object B), the tie rod pressing portion 72 of the tie rod pressing member 70 comes into contact with the tie rod 50 to press the tie rod 50. In the above step, the object B comes into contact with the load receiver 73, and pushes the load receiver 73 backward direction of the vehicle, thereby increasing the pressing pressure of the tie rod pressing portion 72 on the tie rod 50. Thus, the tie rod 50 starts bending deformation in a direction which allows the tie rod 50 to project backward, and the front wheel 30 is steered in a direction (toe-in direction), so that the front end thereof moves inward in the vehicle width direction, and the rear end thereof moves outward in the vehicle width direction.

Figure 6:
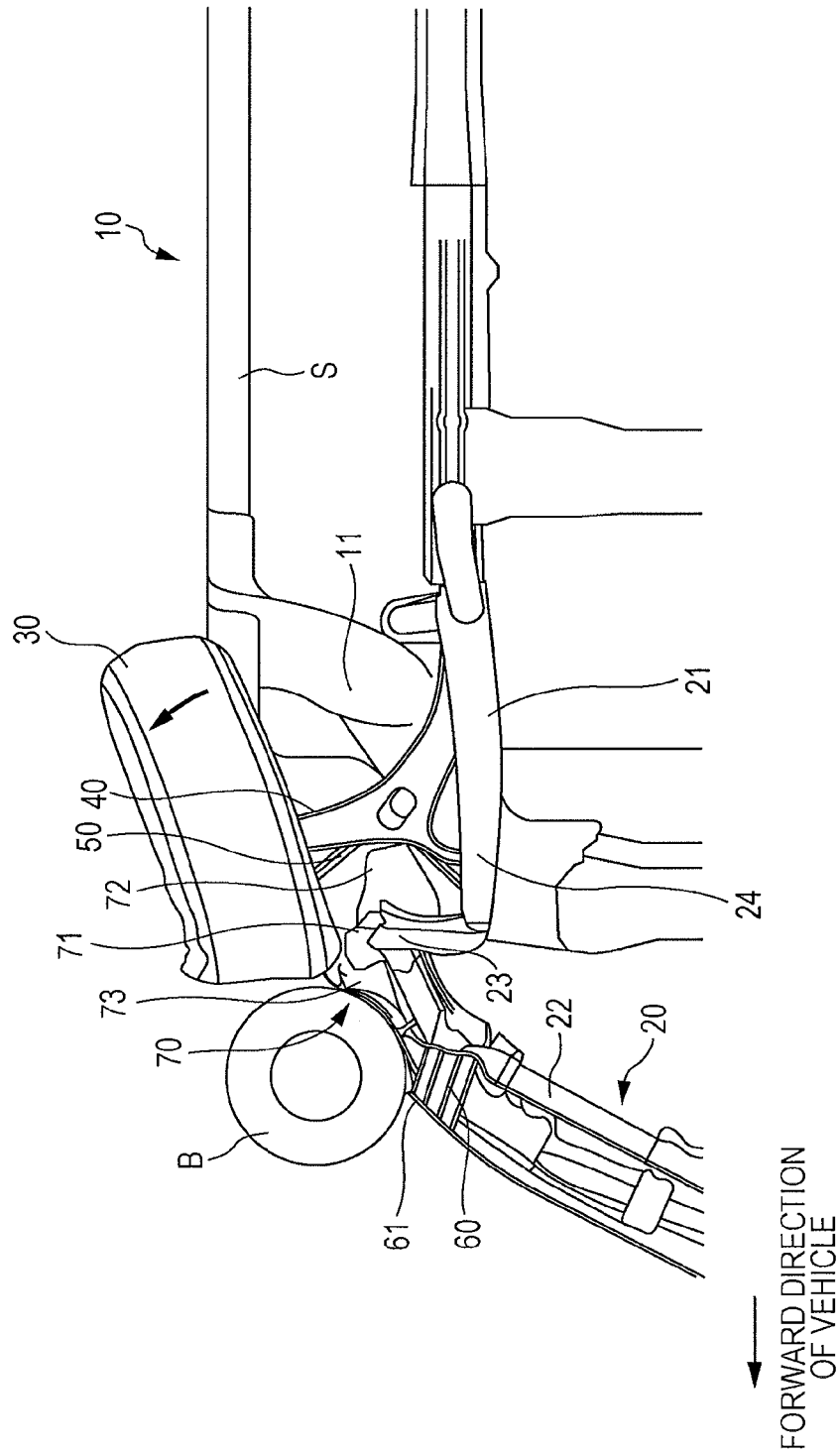
FIG. 6 is a bottom view of the front vehicle body structure in the embodiment after vehicle body deformation due to the collision ceases.

FIG. 6 is a bottom view of the front vehicle body structure in the embodiment after the vehicle body deformation due to a collision ceases. As illustrated in FIG. 6, the rear end of the front wheel 30 is displaced outward in the vehicle width direction with respect to a side sill S, and even when the front wheel 30 further moves backward, the rear of the front wheel 30 can be prevented from colliding with the side sill S. Consequently, the load received on the side sill S can be reduced, and collision safety performance can be improved. In the above state, the load receiver 73 of the tie rod pressing member 70 has been crushed by a compression load in the fore-and-aft direction, and thus energy absorption effect is achieved.

As described above, according to the embodiment, the following effects can be obtained.
(1) When a small overlap offset collision occurs, the front sub frame 21 is bent and deformed by the crash box 60, the tie rod pressing member 70 is rotated in a direction in which the tie rod pressing portion 72 is opened outward in the vehicle width direction, and thus the tie rod 50 is bent and deformed so as to steer the front wheels 30 in a toe-in direction, while steering of the front wheels 30 is not interfered with when the vehicle is in normal operation (when no collision occurs), and therefore the rear of the front wheels 30 can be prevented from colliding with the side sill S, thereby improving collision safety performance.

(2) The joint part A between the front sub frame 20 and the front side frame is disposed outward in the vehicle width direction with respect to the normal line direction of the front end surface 61 of the crash box 60, thereby generating the moment M which causes the portion on which the tie rod pressing member 70 of the front sub frame 20 is mounted to rotate around the joint part A. Thus the above-described effect can be obtained without fail.

(3) Reproducibility of the bending deformation mode at the time of a collision can be improved by providing the front sub frame 20 with the bending portion 23.

(4) The pressing pressure of the tie rod pressing portion 72 tie rod 50 due to a load received from the object B is increased by providing the tie rod pressing member 70 with the load receiver 73, and thus the tie rod 50 can be bent and deformed without fail.

(5) The tie rod pressing portion 72 of the tie rod pressing member 70 is disposed at a position so as to overlap with the side portion 21 of the front sub frame 20 in a plan view of the vehicle when the vehicle is in normal operation, and the tie rod pressing member 70 does not interfere with the steering of the front wheels 30 in normal operation, thereby causing no disadvantage such as an increase in the minimum turning radius of the vehicle.

MODIFICATION

The present invention is not limited to the embodiment described above, and various modifications and alterations may be made. The modified or altered embodiments are also in the technical scope of the present invention. The shapes, structures, materials, manufacturing process, and arrangement of the members that constitute the front vehicle body structure are not limited to those of the above-described embodiment, and may be changed as needed. For example, the rotational movement generating member and the tie rod pressing member may be integrally formed.

What is claimed is:

1. A front vehicle body structure comprising:
a pair of front side frames on right and left which project in a forward direction of a vehicle from a front of a cabin;
a front sub frame which is mounted on a lower portion of the front side frames;
a tie rod which is disposed forwardly of an axle of a front wheel and configured to steer the front wheel;
a tie rod pressing member having a pressing portion which is mounted on the front sub frame in front of the tie rod in the forward direction of the vehicle and is configured to press the tie rod from a front side at a time of a collision; and
a rotational movement generating member which is disposed projecting from the front sub frame in the forward direction of the vehicle, and configured to cause the tie rod pressing member to generate a rotational movement by bending and deforming an area in a direction in which a rear side of the area opens outward in a vehicle width direction with respect to a front side of the area, using a load received from a forward position of the vehicle at a time of a collision, the area being a site on which the tie rod pressing member is mounted in the front sub frame,
wherein the pressing portion of the tie rod pressing member is displaced by the rotational movement from a first position which is out of a steering range of the front wheel to a second position at which the pressing portion swings outward in the vehicle width direction and which allows pressing of the tie rod.

2. The front vehicle body structure according to claim 1, wherein a joint part between the front sub frame and the front side frame is disposed outward in the vehicle width direction with respect to a normal line direction of a load receiving surface provided at a front end of the rotational movement generating member.

3. The front vehicle body structure according to claim 1, wherein the front sub frame has a bending portion in a range which is located rear of a mounting part of the tie rod pressing member relative to a forward direction of the vehicle, and is located in front of the pressing portion relative to a forward direction of the vehicle, an outside of the bending portion projecting in the vehicle width direction.

4. The front vehicle body structure according to claim 2, wherein the front sub frame has a bending portion in a range which is located rear of a mounting part of the tie rod pressing member relative to a forward direction of the vehicle, and is located in front of the pressing portion relative to a forward direction of the vehicle, an outside of the bending portion projecting in the vehicle width direction.

5. The front vehicle body structure according to claim 1, wherein the tie rod pressing member is disposed projecting from the front sub frame outward in the vehicle width direction, and includes a load receiver configured to receive an input of a load from a forward side of the vehicle after the pressing portion is displaced to the second position.

6. The front vehicle body structure according claim 2, wherein the tie rod pressing member is disposed projecting from the front sub frame outward in the vehicle width direction, and includes a load receiver configured to receive an input of a load from a forward side of the vehicle after the pressing portion is displaced to the second position.

7. The front vehicle body structure according to claim 3, wherein the tie rod pressing member is disposed projecting from the front sub frame outward in the vehicle width direction, and includes a load receiver configured to receive an input of a load from a forward side of the vehicle after the pressing portion is displaced to the second position.

8. The front vehicle body structure according to claim 4, wherein the tie rod pressing member is disposed projecting from the front sub frame outward in the vehicle width direction, and includes a load receiver configured to receive an input of a load from a forward side of the vehicle after the pressing portion is displaced to the second position.

9. The front vehicle body structure according to claim 1, wherein the pressing portion of the tie rod pressing member, when being disposed at the first position, overlaps with the front sub frame in a plan view of the vehicle.

10. The front vehicle body structure according to claim 2, wherein the pressing portion of the tie rod pressing member, when being disposed at the first position, overlaps with the front sub frame in a plan view of the vehicle.

11. The front vehicle body structure according to claim 3, wherein the pressing portion of the tie rod pressing member, when being disposed at the first position, overlaps with the front sub frame in a plan view of the vehicle.

12. The front vehicle body structure according to claim 4, wherein the pressing portion of the tie rod pressing member, when being disposed at the first position, overlaps with the front sub frame in a plan view of the vehicle.

13. The front vehicle body structure according to claim 5, wherein the pressing portion of the tie rod pressing member, when being disposed at the first position, overlaps with the front sub frame in a plan view of the vehicle.

14. The front vehicle body structure according claim 6, wherein the pressing portion of the tie rod pressing member, when being disposed at the first position, overlaps with the front sub frame in a plan view of the vehicle.

15. The front vehicle body structure according to claim 7, wherein the pressing portion of the tie rod pressing member, when being disposed at the first position, overlaps with the front sub frame in a plan view of the vehicle.

16. The front vehicle body structure according to claim 8, wherein the pressing portion of the tie rod pressing member, when being disposed at the first position, overlaps with the front sub frame in a plan view of the vehicle.

* * * * *